US012566579B2

(12) United States Patent
Bhatt et al.

(10) Patent No.: US 12,566,579 B2
(45) Date of Patent: Mar. 3, 2026

(54) METHODS AND PRINTING SYSTEM USING PAGE COMPLEXITY DETECTION FOR PRINTING OPERATIONS

(71) Applicant: Kyocera Document Solutions Inc., Osaka (JP)

(72) Inventors: Jayant Bhatt, Torrance, CA (US); Javier A. Morales, Rochester, NY (US); Mohammed Mostafa, Hawthorne, CA (US); Yoshihiro Osada, Torrance, CA (US); Arturo Becerra, Los Angeles, CA (US)

(73) Assignee: Kyocera Document Solutions Inc., Osaka (JP)

( * ) Notice: Subject to any disclaimer, the term of this patent is extended or adjusted under 35 U.S.C. 154(b) by 163 days.

(21) Appl. No.: 18/244,611

(22) Filed: Sep. 11, 2023

(65) Prior Publication Data

US 2025/0085910 A1    Mar. 13, 2025

(51) Int. Cl.
G06F 3/12 (2006.01)
(52) U.S. Cl.
CPC .......... G06F 3/1241 (2013.01); G06F 3/1212 (2013.01); G06F 3/122 (2013.01)

(58) Field of Classification Search
CPC .... G06F 3/1212; G06F 3/1241; G06F 3/1267; G06F 3/1211; G06F 3/122
See application file for complete search history.

(56) References Cited

U.S. PATENT DOCUMENTS

| | | | |
|---|---|---|---|
| 2012/0133984 A1* | 5/2012 | Hayakawa | G06F 3/124 |
| | | | 358/1.16 |
| 2013/0063765 A1* | 3/2013 | Lax | G06F 3/1243 |
| | | | 358/1.15 |
| 2018/0107905 A1* | 4/2018 | Davies | G06K 15/4065 |

* cited by examiner

*Primary Examiner* — John R Wallace
(74) *Attorney, Agent, or Firm* — Millen, White, Zelano & Branigan P.C.; William F. Nixon

(57) ABSTRACT

A print job intended for subsequent printing operations includes complex and simple pages. Each page is analyzed for a page complexity determination. A base page weight related to engine speed of the print engine is compared against a page weight of the page to determine whether the page is complex. A complex page is one with a page weight equal to or greater than the base page weight. If the page is complex, then it is rendered by the RIP system and stored. If the page is simple, then it is not rendered but will be rendered when the job is printed as it can be rendered at engine speed. A complexity model and complexity rules also are used to enhance the determination process.

10 Claims, 11 Drawing Sheets

700 ⟶

828 Complexity Rules

850 Max Image Threshold

852 Max Form Threshold

854 Operator Count Threshold

856 Drawing Calls Threshold

857 Starting Pages

858 Complexity Factors

860 Spot Color

862 Specific Gradient

864 Specific Image

866 Transparency

868 Percentage Threshold

870 Rendered Pages Threshold

872 Storage Free Space Threshold

METHODS AND PRINTING SYSTEM USING PAGE COMPLEXITY DETECTION FOR PRINTING OPERATIONS

FIELD OF THE INVENTION

The present invention relates to a printing system and associated methods to predict page complexity to improve performance of processing print jobs in a printing system.

DESCRIPTION OF THE RELATED ART

People that create jobs for print shops, such as graphic designers, may not be aware of good practices required to create efficient portable document format (PDF) documents that print with a good performance. For this reason, print shops will apply PDF optimizations to incoming files. These optimizations attempt to streamline PDFs in order to ensure the print jobs can be processed fast enough to drive even the fastest printing devices. Although the optimization applications may address many PDF inefficiencies, they cannot resolve every problem. Further, they cannot optimize files that are simply complex due to their design or appearance.

PDF complexity generally varies substantially from page to page. For example, in a 40 page PDF book, the first page of the document takes longer to raster image process than all other document pages combined. The above cases are handled by building a buffer of rendered pages before printing starts. The buffer should, ideally, be large enough so that pages that cannot be rendered at engine speed have enough time to raster image process before they are needed for the print engine. The process works as long as the buffer is large enough and as long as there are not too many complex pages too close to each other, which may deplete the rendered page buffer.

SUMMARY OF THE INVENTION

A method for managing printing operations is disclosed. The method includes receiving a print job having a plurality of pages at a digital front end (DFE) of a printing device. The method also includes determining a first page weight of the plurality of pages. The first page weight relates to at least one page object within the first page. The method also includes retrieving a base page weight for the print engine. The base page weight corresponds to a speed of the print engine. The method also includes comparing the first page weight for the first page to the base page weight. The method also includes determining the first page is complex based on the comparison. The method also includes rendering the first page at the DFE.

A method for managing printing operations is disclosed. The method includes receiving a print job having a plurality of pages at a printing device. The printing device includes a digital front end (DFE) for processing the print job and a print engine to perform printing operations. The method also includes retrieving page object weights for a plurality of page objects. The method also includes assigning a page object weight for each page object within a first page of the plurality of pages. The method also includes determining a first page weight for the first page according to the page object weight for each page object. The method also includes retrieving a base page weight from the DFE. The base page weight corresponds to a print speed for the print engine. The method also includes determining whether the first page is a complex page or a simple page according to the first page weight and the base page weight. The method also includes, if the first page is the complex page, rendering the first page with the DFE. The method also includes, if the first page is the simple page, delaying rendering of the first page.

A method for managing printing operations is disclosed. The method includes receiving a print job having a plurality of pages at a printing device. The printing device includes a digital front end (DFE) for processing the print job and a print engine to perform printing operations. The method also includes determining to process a first page using a raster image processing (RIP) system of the DFE. The method also includes retrieving page object weights for a plurality of page objects. The method also includes assigning a page object weight for each page object within a first page of the plurality of pages. The method also includes determining a first page weight for the first page according to the page object weight for each page object. The method also includes retrieving a base page weight from the DFE. The base page weight corresponds to a print speed for the print engine. The method also includes determining whether the first page is a complex page according to the first page weight and the base page weight. The method also includes, if the first page is a complex page, rendering the first page within the DFE. The method also includes, if the first page is not the complex page, applying a first complexity rule for the RIP system to the first page. The method also includes rendering the first page based on the first complexity rule.

BRIEF DESCRIPTION OF THE DRAWINGS

Various other features and attendant advantages of the present invention will be more fully appreciated when considered in conjunction with the accompanying drawings.

DETAILED DESCRIPTION OF THE PREFERRED EMBODIMENTS

Figure 1:
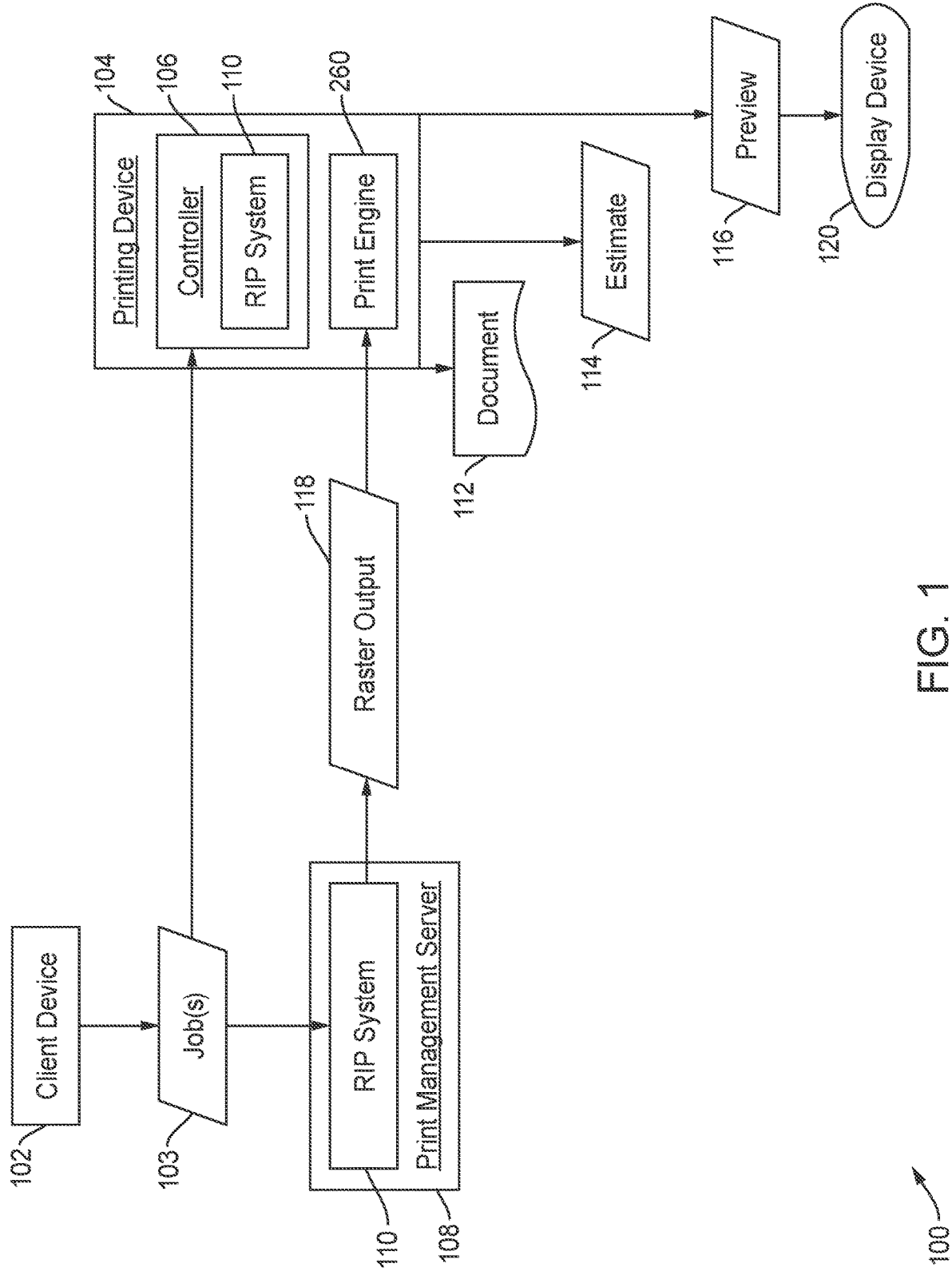
FIG. 1 illustrates a printing system for managing jobs according to the disclosed embodiments.

Reference will now be made in detail to specific embodiments of the present invention. Examples of these embodiments are illustrated in the accompanying drawings. Numerous specific details are set forth in order to provide a thorough understanding of the present invention. While the embodiments will be described in conjunction with the drawings, it will be understood that the following description is not intended to limit the present invention to any one embodiment. On the contrary, the following description is intended to cover alternatives, modifications, and equivalents as may be included within the spirit and scope of the appended claims.

The disclosed embodiments provide a page complexity detection process based on the analysis of a variety of print jobs. Once the process is established with the appropriate rules and methods, the page complexity detection is automatic. The disclosed embodiment provide the opportunity to address gaps in complex job processing performance by differentially processing complex document pages. The objective of page complexity detection is to improve the performance of processing a job. For example, the disclosed embodiments may improve the processing of a "process and hold" job. A "process and hold" job is one where the print job is processed but not printed.

The disclosed embodiments also may improve the performance of a print job when the print engine is not accepting rendered pages. For example, the print engine is offline or in a jammed state. The application of page complexity is to improve the performance of a print job where rendered pages of the print job are deferred and printed at a later time on user demand. The purpose of this feature is to render only complex pages of a print job, leaving simple pages to be processed on demand as these can be rendered at engine speed. The challenge is to determine the simple pages of a job without spending too much time in the determination process.

Page complexity determination results in the print job finishing faster. It also may reduce the amount of storage required to keep the rendered pages.

The complexity detection of a page may be implemented in the raster image processing (RIP) system or module having a raster image processor (RIP). Complexity detection also may be implemented in the front end or to the user interface (UI) client application. The front end sets a complexity page detection flag during a page start request to the RIPs. The interpreter does a preflight inspection of the page and collects statistics, only if the complexity flag is true. The interpreter in the RIP may perform the complexity detection based on a certain set of rules and a weighted formula. If the page is determined to be simple, then the RIP will return back to the front end with an error, that informs the front end that the page is simple. The front end will mark this page as not rendered. The page then will be rendered on the fly when the print job is actually printed. If the page is determined to be complex, then the RIPs will render the page before returning back to the front end of the RIP system.

The page complexity detection is based on a set of rules and a weighted formula. The complexity detection requires gathering statistics and creating a model, based on which the complexity of a page will be determined. The model is based on the various components of a page, namely, the type of object (vector, text, and image). The drawing of objects are further classified into operators, namely form, shading, group, Type 3 characters, pattern, font, color space, and the like.

Creation of a model may involve running a large number and variety of test cases through the system to gather statistics. The disclosed embodiments may establish a base page weight against a print engine to determine the complexity of a page. The base weight also may be used to distribute a weightage to different operators on a page.

Thus, the first step of the disclosed embodiments may be to establish the base page weight, which is determined based on engine speed of the printing device. Once the base weight is established, the page weight is determined for each page in the print job. Any page that has a weight over or equal to the base weight is marked as complex. A page having a page weight under the base weight is marked as simple.

Once the base weight is established for one engine, it can be scaled for different engine speeds, assuming that the rendering performance increases with engine speed. For example, a base weight of 10.0 is established for a 150 page per minute (PPM) engine. The base weight will scale to 20.0 for a 300 PPM engine, which may have a scale of 2. A page determined as complex on the 150 PPM engine may not be marked as complex for a 300 PPM engine.

The second step of the disclosed embodiments may be to assign weights to different object in a page. The different objects also may include operators, such as shading, color space, pattern, path, image, form, text, font, group, color, and the like. The different objects also may include data, such as form size, path size, image size, shade size, and the like. The weight to the different objects may be assigned relative to the base page weight. The weights are assigned after analyzing each object over a large selection of jobs. The complexity determination is based on a weighted formula that uses operators, operator count, and the size of operators to get the page weight.

The third step of the disclosed embodiments may establish a set of rules for page complexity determination. Example rules may include:

a page is marked complex if the complexity formula weight exceeds the base page weight;

a page is marked complex if the size of a single image exceeds a maximum threshold value;

a page is marked complex if the size of a single form exceeds a maximum form threshold value;

a page is marked complex if it exceeds the operator count threshold;

a page is marked complex if the number of drawing calls exceeds a threshold value, where examples of drawing calls are fill, stroke, text, image, and the like;

the initial starting pages equaling the number of RIPs may always be rendered. For example, in a 16 RIP system, the first 16 pages always are rendered and no complexity is determined for these initial page;

the data weight increases by a complexity factor if a spot color is detected for an operation;

the data weight increases by a complexity factor for a specific gradient type;

the data weight increases by a complexity factor for a specific image type;

the data weight increases by a complexity factor if transparency is detected for an operation;

for a job containing mostly complex pages, only a certain percentage of pages are rendered. The front end will stop sending pages to the RIPs after a certain percentage of pages in a job are rendered;

only a certain number of pages in a print job are rendered to avoid excess resource usage, and time competiveness. The front end will stop sending pages to the RIPs after rendered pages threshold is met; and the front end will stop sending pages to the RIPs if the disk free space falls below a threshold level.

The final step of the disclosed embodiments may be determining the complexity of a page by applying rules, the weighted formula on the objects of a page, and comparing the result to the base page weight.

FIG. 1 depicts a printing system 100 for managing jobs using RIP system 110 according to the disclosed embodiments. Printing system 100 may be located in a print shop or other environment suitable for production printing operations. Printing system 100 includes one or more printing devices 104 that receive jobs 103 from one or more client terminals 102.

Printing device 104 receives jobs through printing system 100, such as job 103. In some embodiments, job 103 is a print job. After processing job 103, printing device 104 may print or produce document 112 in a paper or media specified by the print job. Printing device 104 is disclosed in greater detail in FIG. 2. Printing device 104 also includes a controller, or digital front end (DFE), 106, which facilitates processing job 103. Controller 106 also includes RIP system 110, which is disclosed in greater detail below.

For example, controller 106 may use RIP system 110 to convert bitmap images, vector graphics, fonts, and the like associated with pages in job 103 to bitmap/rasterized representations of the pages, such as C, M, Y, and K pixels. The sum of the values of pixels of a particular color in the rasterized pages may be proportional to the amount of consumables used by printing device 104 to print that color. RIP system 110 may rasterize pages of job 103 according to various image rasterization settings. For example, these image rasterization parameters may include calibration curves, paper definitions, ICC profiles, spot color definitions, TRCs, color conversion settings, colorant limits for ink or toner, rendering intent, K preservation, CGR level, max colorant densities, print margins, halftones, and the like.

Print engine 260 also is included with printing device 104. Printing device 104 may correspond to an industrial printing device capable of printing thousands of pages in an hour. Printing device 104 may be ink-based, toner-based, or both. Print engine 260 may include various parameters that can control the operation of printing device 104. For example, these settings may include printing device maintenance settings that control or effect head cleaning intervals, head clogging prevention intervals, and the like of printing device 104. Print engine 260 receives raster output from RIP system 110 in printing device 104 to print document 112 based on job 103.

Printing system 100 receive job 103 and may route it directly to printing device 104. Alternatively, printing system 100 may route job 103 to print management server 108. Print management server 108 may seek to offload processing of job 103 from controller 106 of printing device 104. This feature may be desirable if controller 106 does not have the processing capacity to handle jobs 103 in a production printing environment. Thus, print management server 108 also may include RIP system 110 that can provide raster output 118 directly to print engine 260 of printing device 104. These embodiments allow controller 106 to offload processing in order to handle other operations. Further, updates to RIP system 110 may occur at print management server 108 prior to any updates to RIP system 110 in printing device 104.

Job 103 is not always a print job that produces document 112. In some embodiments, job 103 may be an estimation job or a preview job. RIP system 110 determines which type of job is job 103 and configures itself accordingly. For an estimation job, RIP system 110 configures RIPs to process job 103 without impacting print processing within controller 106. The estimation RIPs process job 103 to provide an ink or toner estimate 114. Estimate 114 may be provided to an operator without engaging print engine 260.

For a preview job, RIP system 110 configures RIPs to process job 103 to quickly generate a lower resolution output as preview 116. Preview 116 may be a lower resolution output as compared to document 112 and estimate 114. Preview 116 is provided to the operator to review. Preview 116 may be provided to display device 120 for the operator to review and interact with using an interface. Display device 120 may be a separate device from client device 102 and printing device 104. In other embodiments, display device 120 may be incorporated within client device 102 or printing device 104.

As disclosed above, RIP system 110 may be a smart system that enables optimal processing by using page complexity determination to handle a variety of jobs 103. Different jobs received at printing device 104 or print management server 108 result in different output, such as document 112, estimate 114, or preview 116. The RIP instances within RIP system 110 are configured according to the type of job 103 is received.

Figure 2:
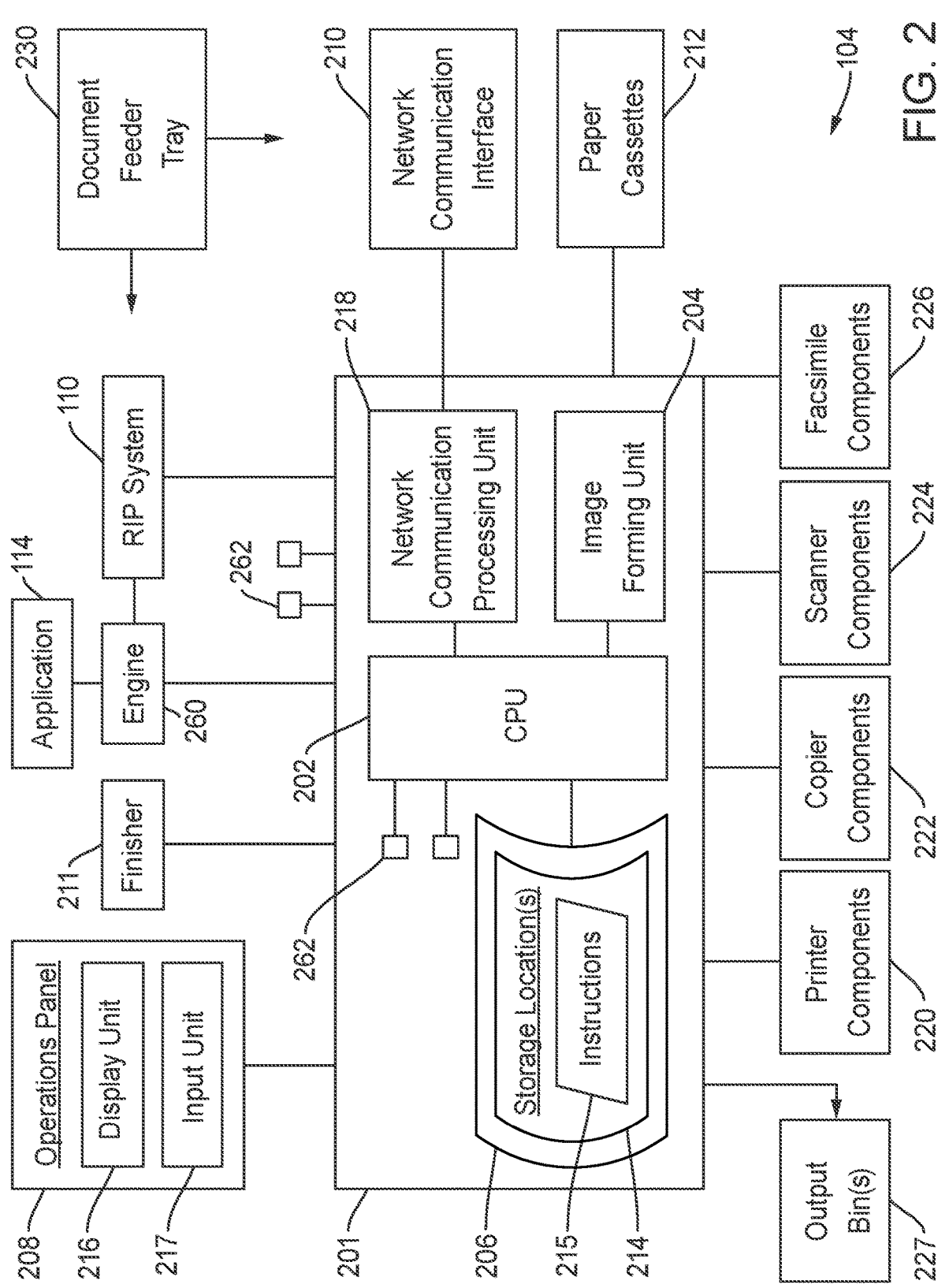
FIG. 2 illustrates a block diagram of components of the printing device for use within the printing system according to the disclosed embodiments.

FIG. 2 depicts a block diagram of components of printing device 104 according to the disclosed embodiments. The architecture shown in FIG. 2 may apply to any multifunctional printing device or image forming apparatus that performs various functions, such as printing, scanning, storing, copying, and the like within printing system 100. As disclosed above, printing device 104 may send and receive data from client device 102, print management server 108, if a separate device, and other devices within system 100.

Printing device 104 includes a computing platform 201 that performs operations to support these functions. Computing platform 201 includes a computer processing unit (CPU) 202, an image forming unit 204, a memory unit 206, and a network communication interface 210. Other components may be included but are not shown for brevity. Printing device 104, using computing platform 201, may be configured to perform various operations, such as scanning, copying, printing, receiving or sending a facsimile, or document processing. As such, printing device 104 may be a printing device or a multi-function peripheral including a scanner, and one or more functions of a copier, a facsimile device, and a printer. To provide these functions, printing device 104 includes printer components 220 to perform printing operations, copier components 222 to perform copying operations, scanner components 224 to perform scanning operations, and facsimile components 226 to receive and send facsimile documents. CPU 202 may issue instructions to these components to perform the desired operations.

Printing device 104 also includes a finisher 211 and one or more paper cassettes 212. Finisher 211 includes rotatable downstream rollers to move papers with an image formed surface after the desired operation to a tray. Finisher 211 also may perform additional actions, such as sorting the finished papers, binding sheets of papers with staples, doubling, creasing, punching holes, folding, and the like.

Paper cassettes 212 supply paper to various components 220, 222, 224, and 226 to create the image formed surfaces on the papers. Paper cassettes 212 also may be known as paper trays. Paper cassettes 212 may include papers having various sizes, colors, composition, and the like. Papers or media within paper cassettes 212 may be considered "loaded" onto printing device 104. The information for printing these papers may be captured in a paper catalog stored at controller 106. Paper cassettes 212 may be removed to refill as needed. The printed papers from components 220, 222, 224, and 226 are placed within one or more output bins 227. One or more output bins 227 may have an associated capacity to receive finished print jobs before it must be emptied or printing paused. The output bins may include one or more output trays.

Document processor input feeder tray 230 may include the physical components of printing device 104 to receive papers and documents to be processed. Feeder tray also may refer to one or more input trays for printing device 104. A document is placed on or in document processor input feeder tray 230, which moves the document to other components within printing device 104. The movement of the document from document processor input feeder tray 230 may be controlled by the instructions input by the user. For example, the document may move to a scanner flatbed for scanning operations. Thus, document processor input feeder tray 230 provides the document to scanner components 224. As shown in FIG. 2, document processor input feeder tray 230 may interact with print engine 260 to perform the desired operations.

Memory unit 206 includes memory storage locations 214 to store instructions 215. Instructions 215 are executable on CPU 202 or other processors associated with printing device 104, such as any processors within components 220, 222, 224, or 226. Memory unit 206 also may store information for various programs and applications, as well as data specific to printing device 104. For example, a storage location 214 may include data for running an operating system executed by computing platform 201 to support the components within printing device 104. According to the disclosed embodiments, memory unit 206 may store the tokens and codes used in performing the deferral operations for printing device 104.

Memory unit 206 may comprise volatile and non-volatile memory. Volatile memory may include random access memory (RAM). Examples of non-volatile memory may include read-only memory (ROM), flash memory, electrically erasable programmable read-only memory (EE-PROM), digital tape, a hard disk drive (HDD), or a solid-state drive (SSD). Memory unit 206 also includes any combination of readable or writable volatile memories or non-volatile memories, along with other possible memory devices.

Computing platform 201 may host one or more processors, such as CPU 202. These processors are capable of executing instructions 215 stored at one or more storage locations 214. By executing these instructions, the processors cause printing device 104 to perform various operations. The processors also may incorporate processing units for specific purposes, such as application-specific integrated circuits (ASICs) and field programmable gate arrays (FP-GAs). Other processors may be included for executing operations particular to components 220, 222, 224, and 226. In other words, the particular processors may cause printing device 104 to act as a printer, copier, scanner, and a facsimile device.

Printing device 104 also includes an operations panel 208, which may be connected to computing platform 201. Operations panel 208 may include a display unit 216 and an input unit 217 for facilitating interaction with a user to provide commands to printing device 104. Display unit 216 may be any electronic video display, such as a liquid crystal display (LCD). Input unit 217 may include any combination of devices that allow users to input information into operations panel 208, such as buttons, a touch screen, a keyboard or keypad, switches, dials, and the like. Preferably, input unit 217 includes a touch-screen digitizer overlaid onto display unit 216 that senses touch to receive inputs from the user. By this manner, the user interacts with display unit 216. Using these components, one may enter codes or other information into printing device 104.

Display unit 216 also may serve as to display results from print management server 108. Display unit 216 may act as display device 120 for displaying preview 116 after it is generated by RIP system 110.

Printing device 104 also includes network communication processing unit 218. Network communication processing unit 218 may establish a network communication using network communication interface 210, such as a wireless or wired connection with one or more other image forming apparatuses or a network service. CPU 202 may instruct network communication processing unit 218 to transmit or retrieve information over a network using network communication interface 210. As data is received at computing platform 201 over a network, network communication processing unit 218 decodes the incoming packets and delivers them to CPU 202. CPU 202 may act accordingly by causing operations to occur on printing device 104. CPU 202 also may retrieve information stored in memory unit 206, such as settings for printing device 104.

Printing device 104 also includes print engine 260, as disclosed above. Engine 260 may be a combination of hardware, firmware, or software components that act accordingly to accomplish a task. For example, engine 260 is comprised of the components and software to print a document. It may receive instructions from computing platform 201 after user input via operations panel 208. Alternatively, engine 260 may receive instructions from other attached or linked devices.

Engine 260 manages and operates the low-level mechanism of the printing device engine, such as hardware components that actuate placement of ink or toner onto paper. Engine 260 may manage and coordinate the half-toner, toner cartridges, rollers, schedulers, storage, input/output operations, and the like. RIP system 100 that interprets the page description languages (PDLs) would transmit and send instructions down to the lower-level engine 260 for actual rendering of an image and application of the ink onto paper during operations on printing device 104. RIP system 110 may be located in DFE 106, as disclosed above. Alternatively, RIP system 110 may be located on print management server 108 and directly communicates with print engine 260.

Printing device 104 may include one or more sensors 262 that collect data and information to provide to computing platform 201 or CPU 202. Each sensor 262 may be used to monitor certain operating conditions of printing device 104. Sensors 262 may be used to indicate a location of a paper jam, failure of hardware or software components, broken parts, operating system problems, document miss-feed, toner level, as well as other operating conditions. Sensors 262 also may detect the number of pages printed or processed by printing device 104. When a sensor 262 detects an operational issue or failure event, it may send a signal to CPU 202. CPU 202 may generate an error alert associated with the problem. The error alert may include an error code.

Some errors have hardware-related causes. For example, if a failure occurred in finisher 211, such as a paper jam, display unit 216 may display information about the error and the location of the failure event, or the finisher. In the instance when the paper jam occurs in paper cassettes 212, display unit 216 displays the information about the jam error as located in one of the paper cassettes.

Some errors have a type of firmware-related cause. For example, network communication processing unit 218 may cause a firmware or software error. Display unit 216 may display the firmware-related error, any applicable error codes, and provide recommendations to address the error, such as reboot the device.

Memory unit 206 may store the history of failure events and occurred errors with a timestamp of each error. Printing device 104 communicates with other devices within system 100 via network communication interface 210 by utilizing a network protocol, such as the ones listed above. In some embodiments, printing device 104 communicates with other devices within system 100 through REST API, which allows the server to collect data from multiple devices within system 100. REST API and SOAP are application protocols used to submit data in different formats, such as files, XML messages, JSON messages, and the like. By utilizing applicable network communication protocols and application protocols, printing device 104 submits and receives data from client device 102 and print management server 108 as well as other printing devices within printing system 100.

Figure 3:
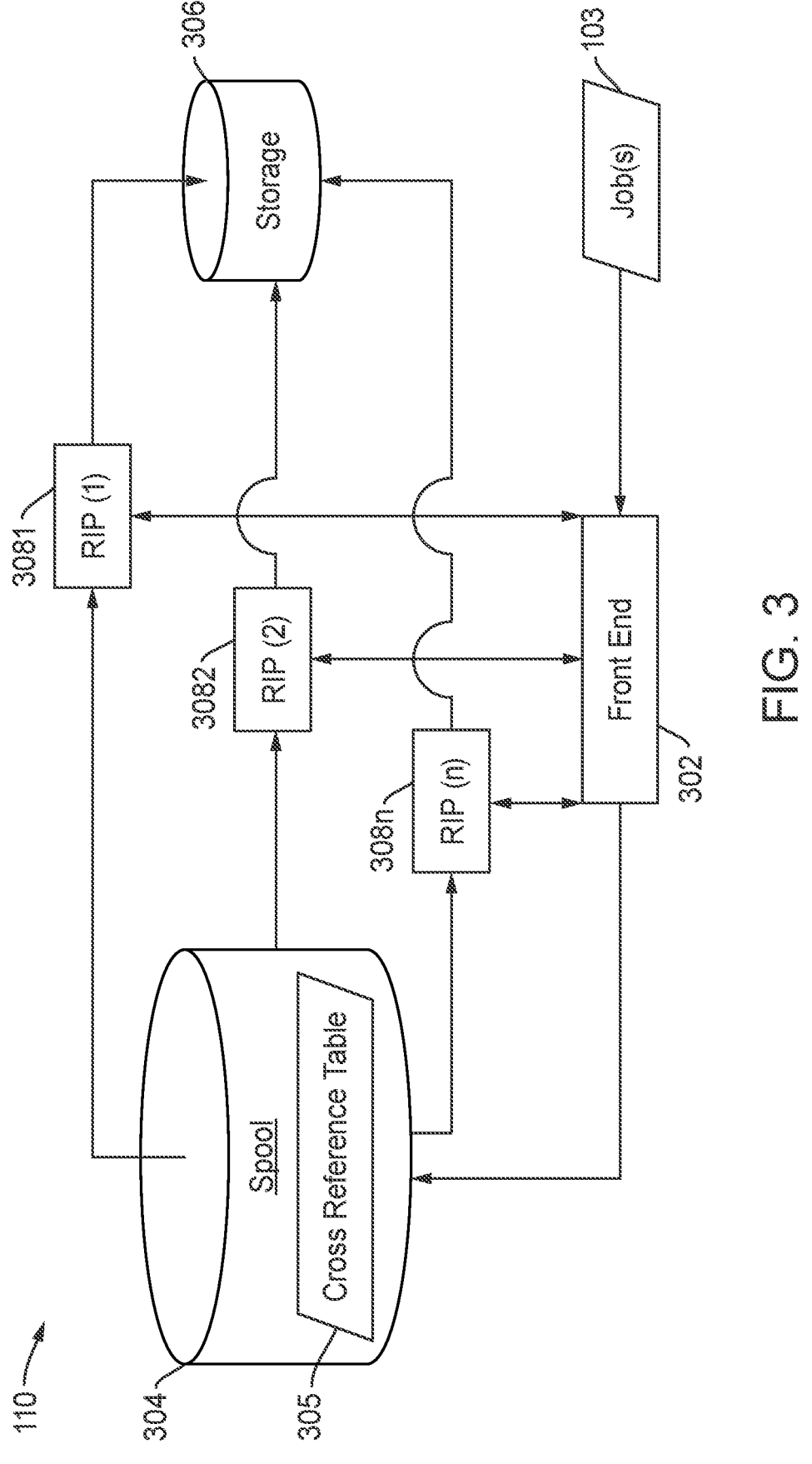
FIG. 3 illustrates a block diagram of a RIP system for use in processing a job in the printing system according to the disclosed embodiments.

FIG. 3 depicts a block diagram of RIP system 110 for use in processing job 103 in printing system 100 according to the disclosed embodiments. As disclosed above, RIP system 110 may be located in controller 106 of printing device 104. It also may be located on print management server 108 such that it communicates directly with print engine 260 of printing device 104.

RIP system 100 include front end 302 and RIP instances RIP 3081, RIP 3082, and RIP 308*n*. A RIP instance may be a RIP configured by front end 302 to process job 103. A RIP instance may be a standard RIP, a high performance RIP, a very high performance RIP, a preview RIP, an estimation RIP, or a failover RIP. All RIP instances and front end 302 operate in parallel to each other.

Front end 302 performs a variety of operations. It may contain multiple subunits that operate in parallel to perform the variety of operations, like spooling job 103, managing job 103, managing pages or segments of job 103, managing RIP instances 3081, 3082, and 308*n*, managing drives, determining the PDL type of job 103, distributing pages of segments of job 103 to the RIP instances, serializing pages or segments of job 103, sending notifications within printing device 104 or print management server 108.

Front end 302 may receive job 103 through printing system 100. Job 103 may be received from client device 102 via internet protocols within printing system 100. Job 103 may be spooled by front end 302 and stored in spool drive 304. Spool drive 304 may be a configurable drive. Front end 302 determines the PDL type of job 103. It then creates a cross reference table 305 in spool drive 304, which acts as a shared memory with RIP instances 3081, 3082, and 308*n*. Front end 302 also may create print ticket information in spool drive 304.

Front end 302 analyzes job 103 to determine which type of job it is. It uses this information to determine the number of RIPs and type of RIPs to be used in processing job 103. These features are disclosed in greater detail below. Depending on the type of job, front end 302 configures RIP instances 3081, 3082, and 308*n*. A configuration operation may create a RIP having a certain number of renderers. For example, RIP instance 3081 may be a standard RIP having a normal number of renderers, such as 4. RIP instance 3082 may be a high performance RIP that has a higher number of renders, such as 6. Front end 302 configures the RIP instances accordingly to process job 103.

Front end 302 then distributes pages or segments of job 103 to RIP instances 3081, 3082, and 308*n*. Job 103 may be a print job that is split into segments or pages for parallel processing. As RIP instance 3082 is a high performance RIP, then it may receive specific pages or segments of job 103. Pages may refer to one or more pages of job 103. Segments of job 103 also may refer to a number of pages or a block of data within job 103. The pages or segments are distributed by front end 302 using inter-process communication.

RIP instances 3081, 3082, and 308*n* may read cross reference table 305 along with print ticket information and the spooled data for job 103. Each RIP instance then processes the page or segment that it is instructed to by front end 302. The RIP instance may check cross reference table 305 to obtain any instructions in the print ticket information and the data for the page or segment in spool drive 304. RIP instances 3081, 3082, and 308*n* then parse the data for the page or segment to create metadata from the drawing commands.

The RIP instances render the metadata to storage 306. Storage 306 may store the rendered pages for a print job of job 103. The rendered pages may be stored according to a specific image format, such as the KYOCERA™ Image Format (KIF). The stored pages may then be provided to print engine 260 to print document 112. For jobs 103 that do not require rendered pages, such as previews and estimates, the data generated by the RIP instances may be provided back to front end 302 for further operations.

RIP system 110 provides advantages over conventional RIP systems. Front end 302 may control the number of renderers per RIP. It may increase the number to process a page or segment faster. It also may increase the amount of memory allocated to the RIP as faster processing consumes more memory. If processing is to be slower, such as for estimate 114 or preview 116, then the configured RIP should consume less memory. Front end 302 manages these requirements through dynamic configuration of the RIPs based on the parameter of job 103.

In some instances, front end 302 may determine that job 103 is not able to be split into pages or segments for parallel processing. Thus, it may configure a RIP instance, such as RIP instance 308*n*, into a very high performance RIP. The very high performance RIP uses more renderers than the high performance RIP. For example, RIP instances 308*n* may be configured to use 8 renderers. This feature increases the processing speed of RIP instance 308*n*. Front end 302 may still use RIP instances 3081 and 3082 for parallel processing on one job 103 while using RIP instance 308*n* for processing another job 103 that is not able to be broken into pages or segments.

RIP system 110 provides features available due to the parallel processing using dynamically configured RIP instances. RIP system 110 may configure a high performance RIP to improve the first page out time. It also may use differently configured RIPs for different purposes, such a preview RIPs, estimation RIPs, and failover RIPs. RIP system 110 also may configure very high performance RIPs for jobs that cannot be processed in a page or segment parallel manner.

RIP system 110 also provides the ability to change the number of renderers per RIP. RIP system 110 also changes the number of RIP instances based on its workload, which includes shutting down certain types of RIPs in order to launch other types of RIPs. RIP system 100 also processes different kinds of jobs in RIPs with different configurations. RIP system 110 also uses different RIPs with different configurations for different purposes. It configures RIP instances with different imaging pipelines. RIP system 110 also retries failed jobs or job pages in a differently configured RIP instance.

Figure 4:
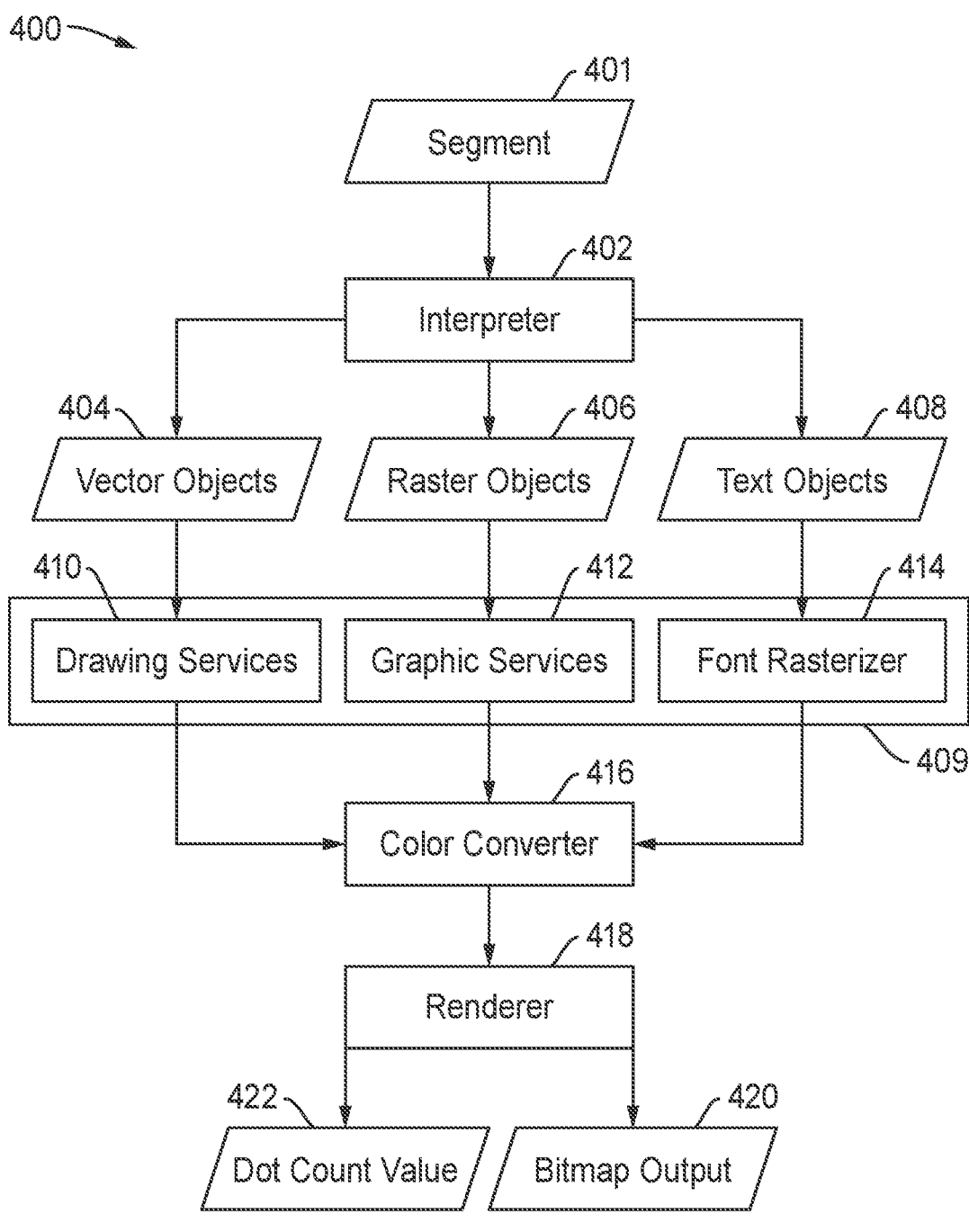
FIG. 4 illustrates a block diagram of an example RIP used within the RIP system according to the disclosed embodiments.

FIG. 4 depicts a block diagram of an example RIP 400 used within RIP system 110 according to the disclosed embodiments. RIP 400 may represent a configuration for RIP instances 3081, 3082, or 308*n*. RIP 400 may represent the hardware and software configuration used to determine what value each pixel or spot of output should possess, driven by commands from a page description language (PDL). Computer-generated output may be composed of very small spots. RIP 400 converts a vector-based image, or a stored image, into a series of mathematical formulas that describe lines and curves into a pattern of spots needed to generate the output, or raster image. Interpreter 402 converts a job file into a display list, which is then converted into a bitmap output 418 describing a page of the document.

RIP 400 converts text and image data from different file formats including PDF, TIFF, or JPEG into a format that printing device 104 can understand. The process of raster image processing a page implements several steps to be performed, regardless whether the page is submitted as PostScript, PDF, or any other page description language (PDL). In short, RIP 400 may provide interpretation, ras-terization, and screening.

Segment 401 may be a job file associated with job 103. Segment 401 may be provided to RIP 400 to convert its code into raster or bitmap code. As disclosed above, front end 302 receives job 103. Front end 302 may split job 103 into segments for parallel processing by the RIP instances. Preferably, segment 401 is a page the document in job 103. RIPs process pages in a parallel manner within RIP system 100. RIP 400 is one of the RIP instances. In other embodi-ments, segment 401 may be several pages, a graphic design, or other portion of job 103.

Segment 401 is received at interpreter 402, which inter-prets the commands in the code to redraw the object and elements of a page as vector objects 404, raster objects 406, and text objects 408. Interpreter 402 parses specific PDLs into drawing commands. The PDL of segment 401 is read and decoded into graphical elements to be placed on a sheet. Each element may be an image, a character of text, a fill, stroke, and the like or listed in vector objects 404, raster objects 406, and text objects 408.

Drawing unit 409 receives vector objects 404, raster objects 406, and text objects 408 to convert the drawing commands into metadata that can be provided to renderer 418. Thus, drawing unit 409 converts vector objects 404 into drawing services 410. It also converts raster objects 406 into graphic services 412. It also converts text objects into font rasterizer 414.

RIP 400 also may implement color converter 416. Color converter 416 may implement color conversion operations for the metadata generated by drawing unit 409. Color converter 416 provides color management and calibration. These actions may be applied during interpretation or ren-dering, depending on configuration and job content. Color printing resources may be accessed to provide the color management.

Renderer 418 processes the metadata from drawing unit 409 to convert every graphical element into the appropriate pattern of pixels to form the output raster. The resolution independent vector objects 404 as drawing services 410 are converted into pixels. Screening takes the raster image of pixels to form individually screened cyan, magenta, yellow, and black separations. These are halftone dots in the form of a bitmap output 420 consisting of commands that can be understood by print engine 260.

The disclosed embodiments also may determine dot count value 422 from the rendered image provided by renderer

418. Dot count values may be adjusted based on screening and based on settings at printing device 104. Dot count value 422 may be reported to determine estimate 114 for an estimation job, as disclosed below.

The rendered bitmap output 420 may be stored in storage 306 to be sent to print engine 260 when all the pages or segments of job 103 are processed. RIP 400 shows one path for rendering and providing output. Preferably, RIP 400 multiple rendering paths that use multiple renderers. The disclosed embodiments may use a renderer 418 for each channel in RIP 400, such as one each for cyan, magenta, yellow, and black. The number of renderers 418 may be configured by front end 302 depending on job 103. Each renderer 418 requires memory and processing resources. A high number of renderers 418 in RIP 400 will consume more memory but run faster. A lower number of renderers 418 in RIP 400 will consume less memory but run slower.

Figure 5:
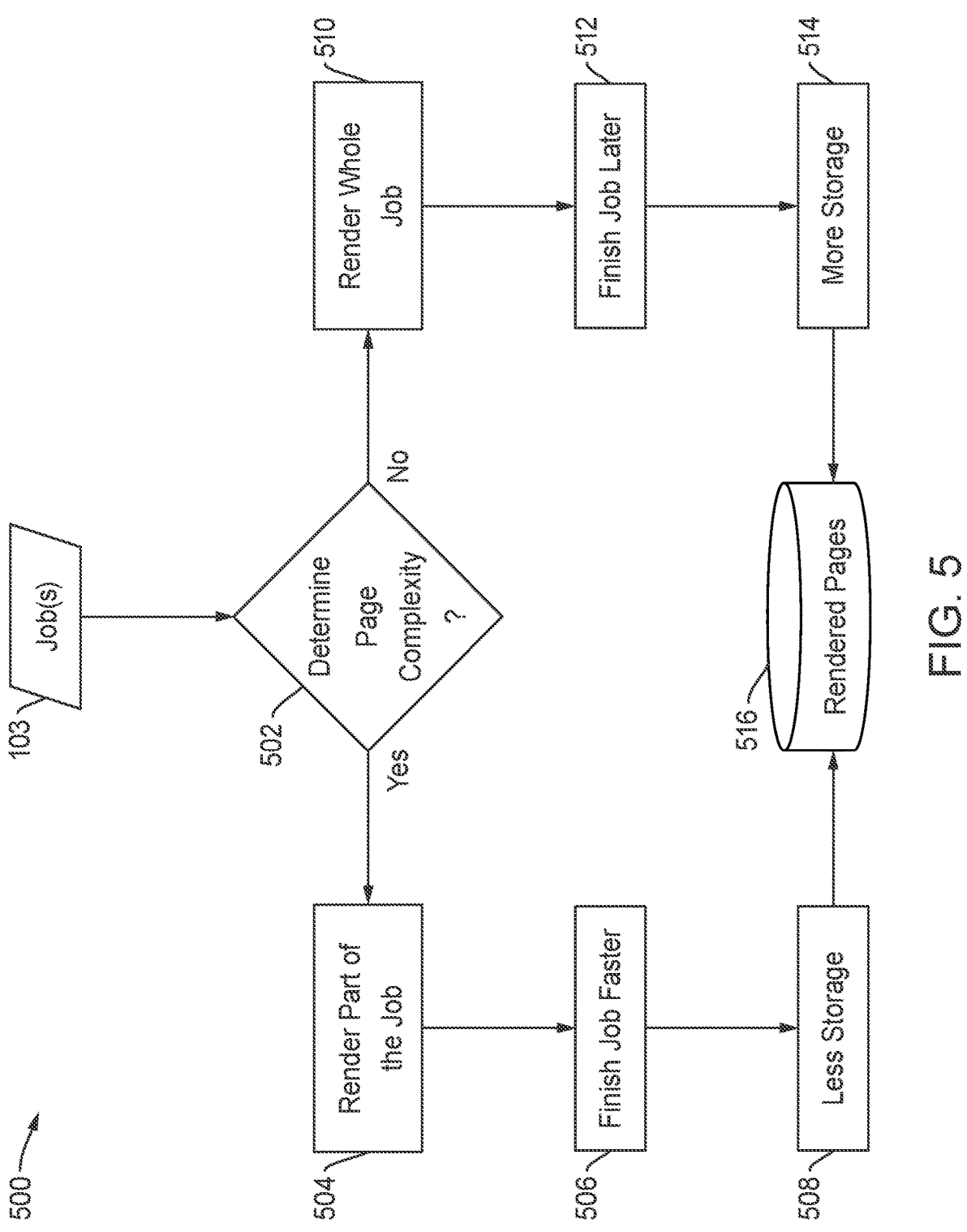
FIG. 5 illustrates a flow diagram for determining page complexity processing benefits for a job according to the disclosed embodiments.

FIG. 5 depicts a flow diagram 500 for determining page complexity processing benefits for a job 103 according to the disclosed embodiments. Flow diagram 500 may refer to FIGS. 1-4 for illustrative purposes. Flow diagram 500, however, is not limited to the embodiments disclosed by FIGS. 1-4.

In flow diagram 500, job 103 may be a "process and hold" job, as defined above. A process and hold job is a print job where the job is processed but not printed. The job may be held for printing at a subsequent time on demand or when printing device 104 is ready. More particularly, job 103 may be held until print engine 260 is ready for printing. For example, print engine 260 may not be accepting rendered pages from RIP system 110 because the print engine is offline or in a jammed state.

Flow diagram 500 shows how the application of page complexity improves printing operations where rendered pages of job 103 are deferred to be printed later. The feature of page complexity detection is to render only complex pages of job 103 and leave simple, or non-complex, pages to be rendered on demand as these pages can be rendered at engine speed. The disclosed embodiments determine the simple pages of job 103 without spending too much time in the determination process, especially if the print job include many different pages with different objects.

A process and hold job may be a large print job, with thousands of pages that take an extended period of time to complete. For example, job 103 may include 600,000 pages and take up to 3 days to process and print. Time taken to render complex pages during the printing process may increase this delay considerably. Further, the amount of storage needed to render all these pages and store the data would be prohibitive. Thus, the amount of storage used to "hold" job 103 until printing should be reduced.

Step 502 executes by determining whether page complex-ity is to be determined for job 103. If yes, then step 504 executes by rendering, using RIP system 110, part of job 103. Specifically, RIP system 110 would render only com-plex pages within job 103. Result 506 of step 504 is that job 103 would finish processing faster at RIP system 110 at printing device 104 or print management server 108. RIP system 110 may be released from processing earlier to address other jobs within printing system 100. Result 508 of step 504 is that processing for job 103 would take less storage on storage 306 of RIP system 110, or other storage used for holding rendered pages.

If step 502 is no, then step 510 executes by rendering all the pages of job 103. No complexity determination is made regarding the pages of job 103. RIP system 110 processes and renders each page. Result 512 of step 510 is that job 103 would finish processing later at RIP system 110 at printing device 104 or print management server 108. RIP system 110 may be tied up with processing longer than using step 504 and not available to process other jobs within printing system 100. Result 512 of step 510 is that processing for job 103 would take more storage or storage 306 of RIP system 110, or other storage used for holding rendered pages.

The rendered pages of step 504 or step 510 would be added to rendered page 516 of RIP system 110. Rendered pages 516 take up storage, such as on storage 306. Further, front end 302 and cross reference table 305 of spool 304 may be updated. An operator of printing system 100 may make determinations whether to invoke page complexity determination based on these benefits, and whether they are applicable. For example, for a small process and hold print job 103, it may not make sense to invoke a page complexity determination process as the amount of storage taken by the rendered pages is not prohibitive.

Figure 6:
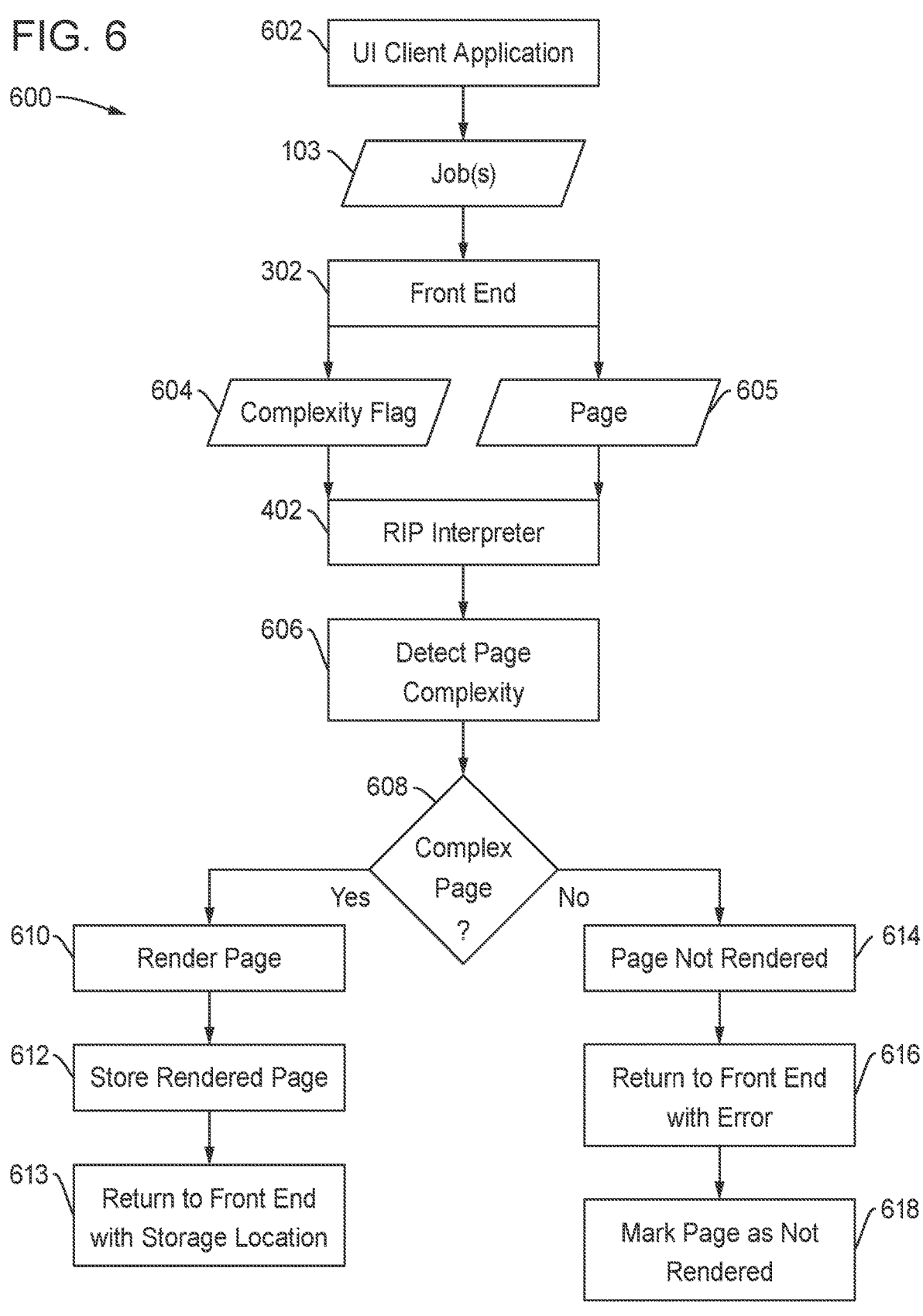
FIG. 6 illustrates a flow diagram for page complexity detection in the RIP system according to the disclosed embodiments.

FIG. 6 depicts a flow diagram 600 for page complexity detection in RIP system 110 according to the disclosed embodiments. Flow diagram 600 may refer to FIGS. 1-5 for illustrative purposes. Flow diagram 600, however, may not be limited to the embodiments disclosed by FIGS. 1-5.

In some embodiments, client device 102 may include a user interface or client application 602 to generate job 103 for printing. In other embodiments, a user interface client application 602 may be located at printing device 104 for production printing operations. In any event, such an application 602 generates incoming job 103 to RIP system 110. Complexity detection according to the disclosed embodiments may be implemented in RIP system 110. In some embodiments, complexity detection may be implemented within controller 106 or user interface client application 602.

Within RIP system 110, job 103 is received by front end 302. If job 103 is to undergo a page complexity determination process, then front end 302 sets a complexity page detection flag 604 during the page start request to the RIPs within RIP system 110. Interpreter 402 for a RIP, such as RIP 3081, RIP 3082, or RIP 308n disclosed above, may receive a page 605 from job 103. Interpreter 402 does a preflight inspection of page 605 and collects statistics, only of complexity flag 604 is true.

Step 606 is executed by detecting page complexity for page 605 by interpreter 402. Interpreter 402 determines the page complexity for page 605 based on a weighted formula and a set of rules. These features are disclosed in greater detail below. Using the information gathered and determined, the disclosed embodiments whether page 605 is complex.

Step 608 executes by determining whether page 605 is complex. This process is disclosed in greater detail below. If step 608 is yes, then page 605 is a complex page and step 610 executes by rendering page 605 within the associated RIP. Step 612 executes by storing rendered page 605 in storage 306 by the associate RIP, as disclosed above. Specifically, rendered page 605 is added to rendered pages 516 in storage 306 with a location within the storage to retrieve the rendered page. Step 613 executes by returning to front end 302 with the storage location of rendered page 605 in storage 306.

If step 608 is no, then page 605 is a simple, or non-complex, page. Step 614 executes by not rendering page 605 by the associated RIP. The RIP will not store any rendered page in storage 306. Step 616 executes by returning to front end 302 with an error, informing the front end that page 605 is simple. Step 618 executes by marking page 605 is not rendered at front end 302. This indication will result in page

605 being rendered on the demand when job 103 is actually printed. Thus, no storage location is taken by page 605 in storage 306.

Figure 7:
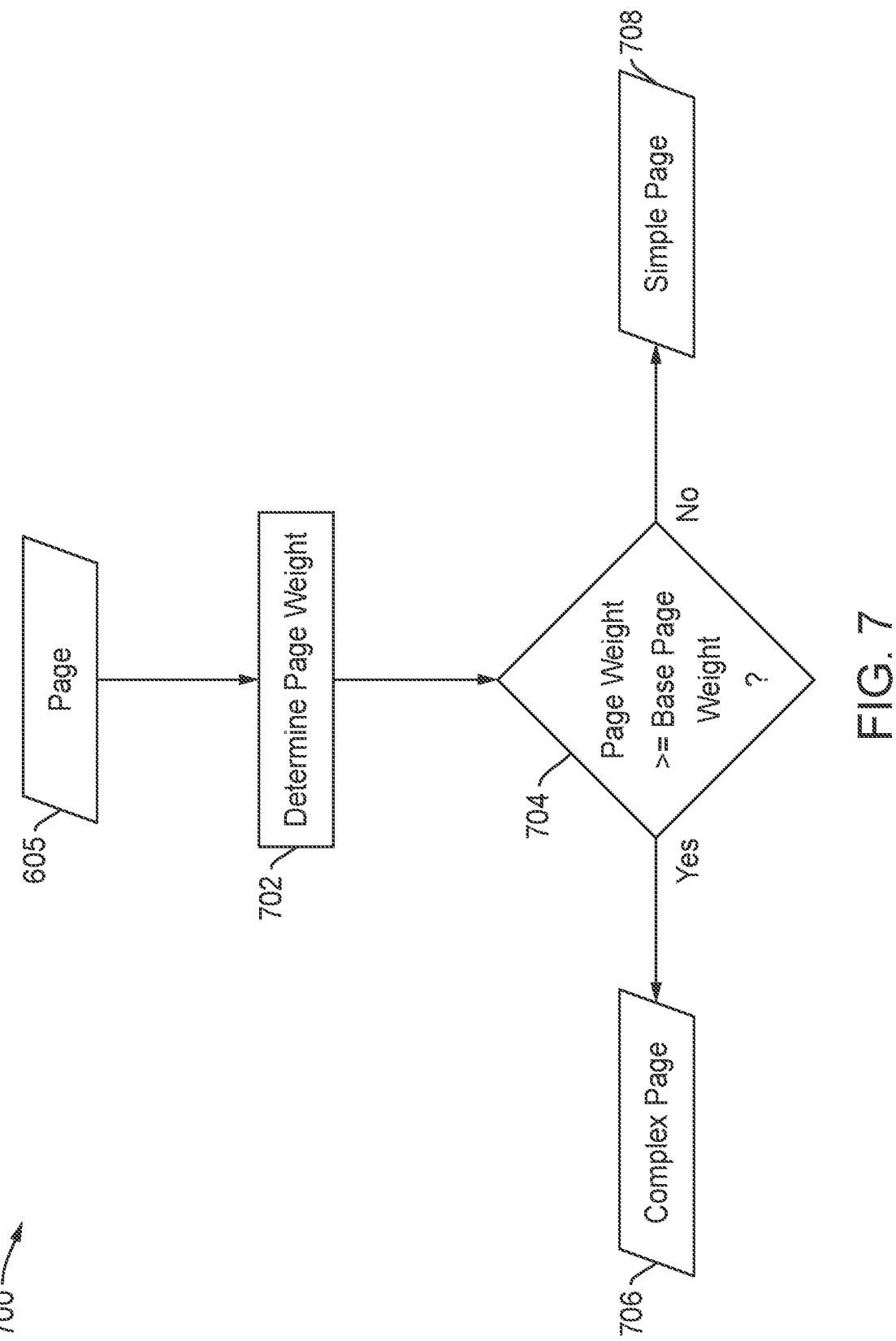
FIG. 7 illustrates a flow diagram for page complexity determination according to the disclosed embodiments.

FIG. 7 depicts flow diagram 700 for page complexity determination according to the disclosed embodiments. Flow diagram 700 may refer to FIGS. 1-6 for illustrative purposes. Flow diagram 700, however, is not limited by the embodiments disclosed by FIGS. 1-6. Flow diagram 700 may be implemented in RIP system 110. More specifically, it may be implemented in an interpreter 402 of a RIP within RIP system 110. In other embodiments, flow diagram 700 may be implemented elsewhere within printing system 100, such as controller 106 or client application 602.

103, which has its complexity flag 604 set to enable page complexity determination operations. Step 702 executes by determining a page weight for page 605. This process is disclosed in greater detail below and is based on a set of rules and a weighted formula. Step 704 executes by determining whether the page weight is greater than or equal to a base page weight. The base page weight is disclosed in greater detail below and is determined based on the engine speed of print engine 260. Thus, determining whether a page is complex relates to whether the page can be rendered "at speed" during printing operations.

If step 704 is yes, then page 605 is marked as a complex page in step 706. Referring to flow diagram 600, page 605 is rendered by the RIP. If step 704 is no, then page 605 is marked as a simple page in step 708. Page 605 is not rendered as shown by flow diagram 600.

Figure 8:
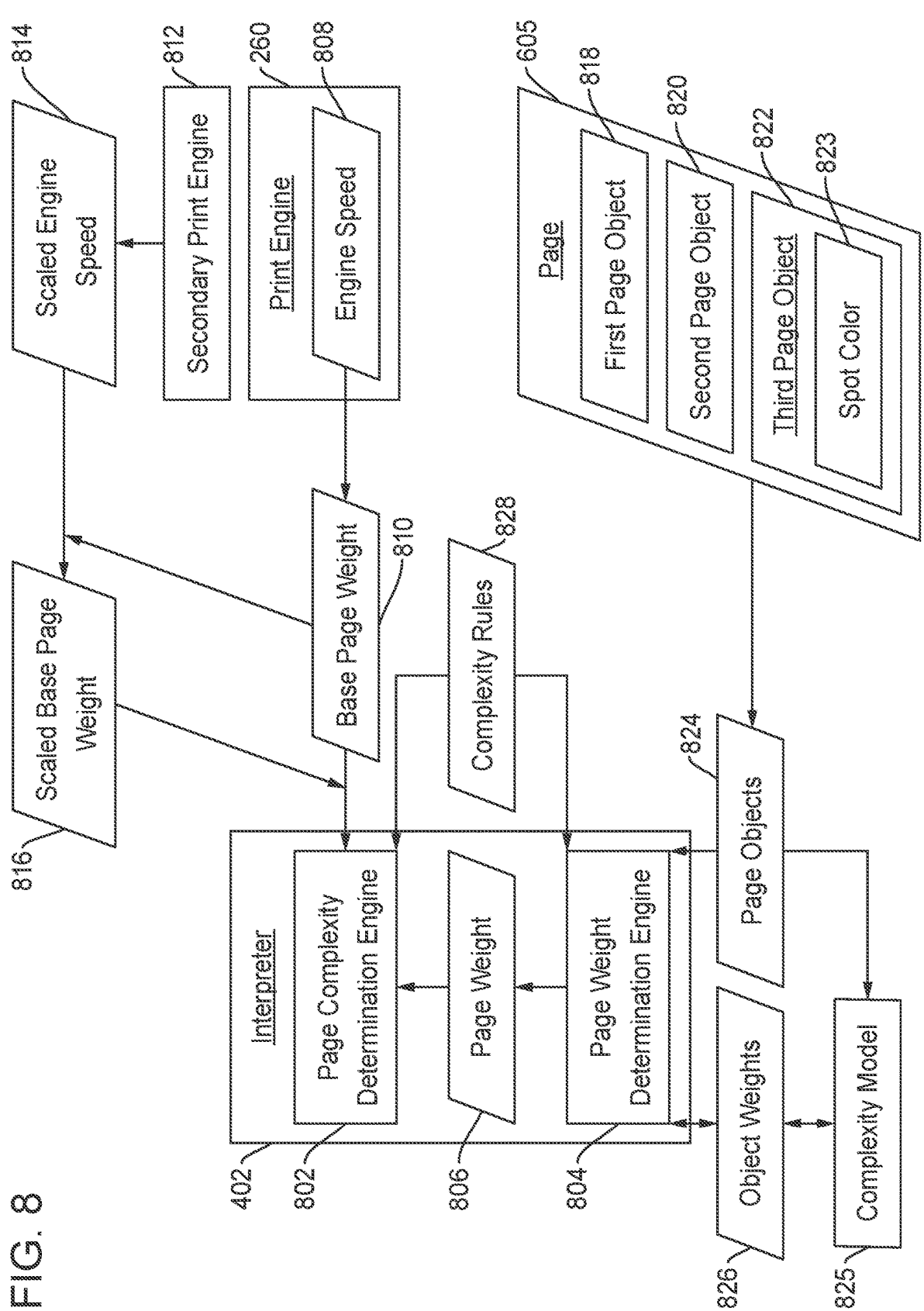
FIG. 8 illustrates a block diagram of the components used for page complexity determination according to the disclosed embodiments.

FIG. 8 depicts a block diagram of the components used for page complexity determination according to the disclosed embodiments. As disclosed above, base page weight 810 and page weight 806 are determined to be used in deciding whether page 605 is complex or simple. Both of these values are calculated using information available from printing device 104, objects without page 605, and complexity rules 828. These features are disclosed in greater detail below.

Base page weight 810 relates to engine speed 808 of print engine 260 of printing device 104. Engine speed 808 may refer to the pages or sheet per minute that printing engine 260 can process, or put ink to paper. This speed may refer to an average speed for a number of previous print jobs, or to the speed to print a page having no objects, such as one with only text. The disclosed embodiments may assign a weight, or value, to engine speed 808.

For example, print engine 260 may have an engine speed 808 of 150 PPM. This value may be based off previous print jobs and their engine speed to print pages of those jobs, regardless of the content on those pages. Alternatively, the disclosed embodiments may take the engine speed of printing certain types of pages, such as text only, pages with objects, pages with color printing, and the like. Using this example, base page weight 810 for engine speed 808 of 150 PPM may be 10.0. Base page weight 810 also may be used to distribute a weightage to different operators on a page, as disclosed below.

In some embodiments, a scaled base page weight 816 may be used that is based on base page weight 810 for another print engine at a separate printing device within printing system 100. For example, secondary print engine 812 may be located in another printing device separate from printing device 104. Once base page weight 810 is established for print engine 260, it may be scaled for different engine speeds as it may be presumed that rendering performance increases or decreases with engine speed.

Thus, scaled engine speed 814 may be the engine speed for secondary print engine 812. Again, scaled engine speed 814 may be determined based on previous print jobs or other criteria. Scaled engine speed 814 will cause base page weight 810 to be scaled to determine scaled base page weight 816 for secondary print engine 812. If scaled engine speed 814 differs from engine speed 808, then scaled base page weight 816 differs from base page weight 810 in a corresponding fashion.

For example, for base page weight 810 of 10.0 for engine speed 808 of 150 PPM, a scaled engine speed 814 of 300 PPM would have a scaled base page weight 816 of 20.0. Secondary print engine 812 can process pages having a higher page weight as it is faster than print engine 260. It would take more objects on a page to have it considered "complex." More complex pages will not delay secondary print engine 812 as it may do for print engine 260. According to these embodiments, base page weight 810 may be used to determine scaled base page weights for any number of print engines within printing system 100.

For determining page weight 806, a page weight determination engine 804 may be implemented within interpreter 402 of a RIP within RIP system 110. Page weight determination engine 804 also may be implemented elsewhere in controller 106, print management server 108, or client application 602. Page weight determination engine 804 may take into account page objects 824 from page 605, object weights 826, and complexity rules 828. These features are disclosed separately below.

Page objects 824 are objects, such as images, graphics, text, and the like, within page 605. For example, page 605 may include first page object 818, second page object 820, and third page object 822. Third page object 822 may include a spot color 823 that is required to print the third page object accurately. As disclosed above, an object may have a type, such as vector, text, or image. Objects may be further classified into operators, such as form, shading, group, Type 3 characters, pattern, font, color space, spot color, and the like. For example, first page object 818 may be a vector object having shading as an operator, second page object 820 may be a text object having a specific font and several Type 3 characters as operators, and third page object 822 may be an image object having spot color 823 as an operator.

The disclosed embodiments may compile the page objects and their operators into page objects 824 for page 605. Page objects 824 are provided to page weight determination engine 804. Page weight determination engine 804 may use one or more weighted formulas plus complexity rules 828 to determine the weights for page objects 824. The weighted formulas also may rely on object weights 826 provide from complexity model 825. The disclosed embodiments gather statistics and generates complexity model 825 based on these determinations. Complexity model 825 is based on various components of a page, such as the type of objects disclosed above, or vector, text, or image. The objects in complexity model 825 also may be further classified into operators.

Figure 9:
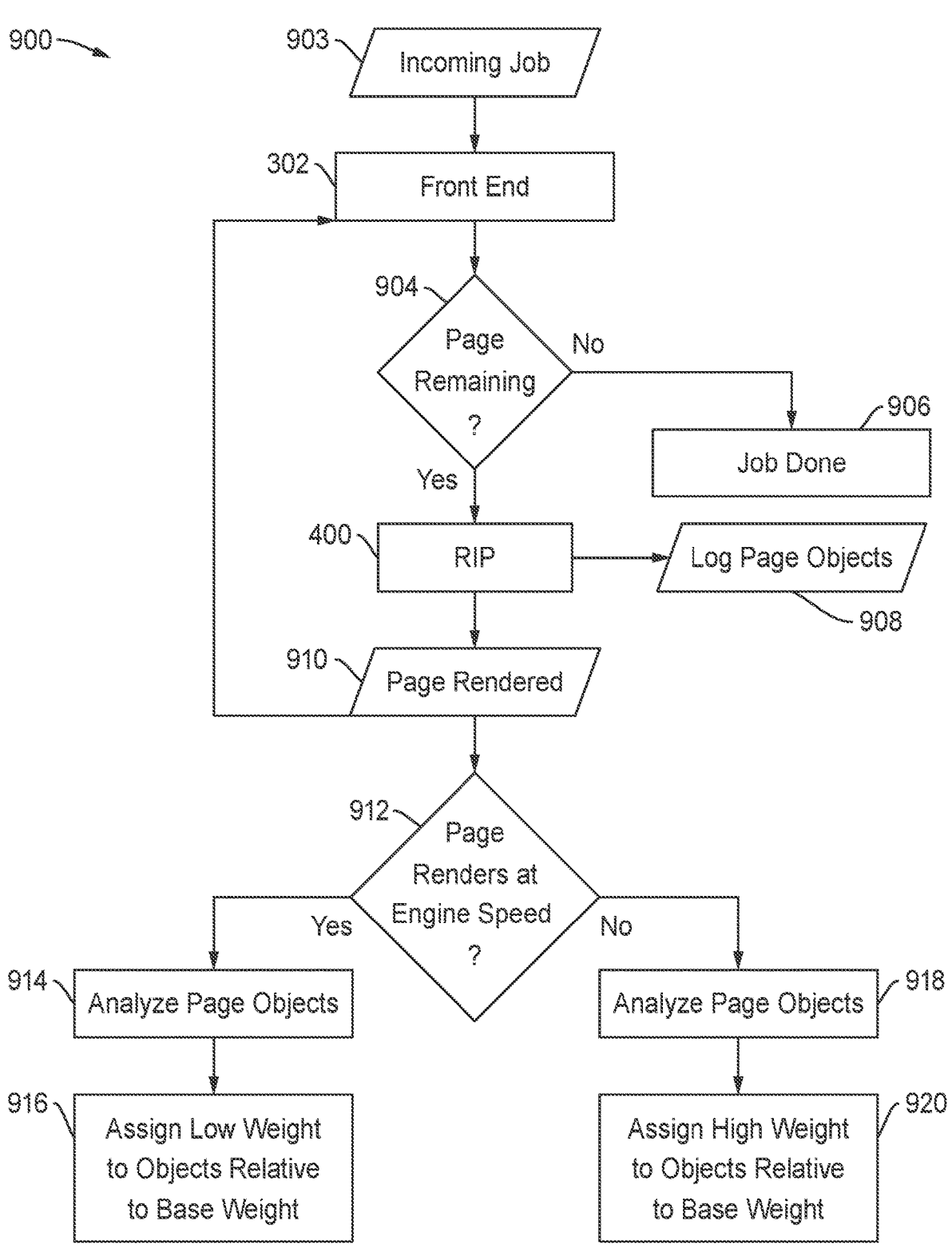
FIG. 9 illustrates a flow diagram for establishing one or more weights of page objects to be used in determining a page weight according to the disclosed embodiments.

The generation of complexity model 825 and determining object weights for use by page weight determination engine 804 may be disclosed by FIG. 9. FIG. 9 depicts a flow diagram 900 for establishing one or more weights of page objects to be used in determining page weight 806 according to the disclosed embodiments. Flow diagram 900 may refer to FIGS. 1-8 for illustrative purposes. Flow diagram 900, however, is not limited to the embodiments disclosed by FIGS. 1-8.

The process disclosed by flow diagram 900 assigns weight to different objects in a page. The objects may include operators, such as shading, color space, pattern, path, image, form, text, fonts, group, color, and the like. The objects also may include data, such as form size, path size, image size, shade size, and the like. These objects are weighted relative to base page weight 810 for print engine 260.

The weights for the objects are assigned after analyzing each object over a large selection of jobs that are rendered by a RIP 400 of RIP system 110. RIP 400 is disclosed above. A weighted formula uses the operators, operator count, and the size of the operators to determine page weight 806. For example, printing device 104 may process a large number of print jobs. RIP system 110 or controller 106 may execute flow diagram 900 to determine object weights to be included in complexity model 825.

Flow diagram 900 starts with incoming job 903 being received within RIP system 110. Front end 302 may receive incoming job 903 having a plurality of pages. Incoming job 903 may be different than job 103 disclosed above as it is not being analyzed to determine its page weight but to provide data to establish complexity model 825 for determine page weights. For each page of incoming job 903, step 904 is executed by determining whether any pages are remaining from incoming job 903 to render. If no, then step 906 executes by indicating that job 903 is done. No more pages are to be rendered.

If step 904 is yes, then the page is provided to RIP 400 for processing and rendering, as disclosed above by FIG. 4. RIP 400 includes interpreter 402. Step 908 executes by logging page objects identified by RIP 400 within the rendered page. In some embodiments, the page from incoming job 903 may only have one page object, such as text, but with different operators, such as multiple fonts or unique characters. Step 910 executes by rendering the page and indicating this fact to front end 302.

After the page is rendered, step 912 executes by determining whether the page from incoming print job 903 is rendered at engine speed 808 for print engine 260. If yes, then step 914 executes by analyzing page objects logged in step 908. Again, these page objects may have specific operators, or data. Step 916 executes by assigning a low weight to the page objects relative to base page weight 810. As these page objects did not hinder processing of the page, they should not cause pages that use the objects in the future to slow down rendering of the pages.

If step 912 is no, then the page is not rendered at engine speed 808. Step 918 executes by analyzing page objects logged in step 908. Again, these page objects may have specific operators, or data. Step 920 executes by assigning a high weight to the page objects relative to base page weight 810. As these page objects did hinder processing of the page, these page objects will cause delays in processing and rendering in subsequent print jobs.

For example, a first page of incoming job 903 may be rendered by RIP 400 at engine speed 808. The first page includes two page objects having unique operators. The disclosed embodiments may assign a low weight to each of the page objects and their operators. If base page weight 810 is a certain amount, then each page object and the operators may receive a weight that is lower than the certain amount. All the object weights, when added together, may correspond to the base page weight. When these same page objects using unique operators are processed in a subsequent print job, they may receive a higher or lower weight, which is captured in complexity model 825. Complexity model 825 adjusts values for the weights over time.

It should be noted that page object weight does not change on subsequent runs, or if contained in a different print job. The weights of the objects will change on the operator used for drawing the object. For example, if the object is drawn with a process color in one job as compared to a spot color in a subsequent, then the weight for the object may change. The base page weight changes depending in the engine speed. A page weight of 9.0 is determined as a simple page with a print engine having the base page weight of 10.0. The same page weight of 9 is determined as complex with an engine having a base page weight of 5.0.

A second page of incoming job 903 also may be rendered by RIP 400, but not at engine speed 808. Second page also may include two page objects having unique operators. The processing and rendering of the second page may take longer than normal. If the processing time took 20% longer than engine speed 808, then a page weight of 12.0 may be assigned to the second page. Thus, weights of 6.0 may be assigned to each page object and its operator. Again, these weights are adjusted as additional pages are processed having similar page objects using different operators.

Using the embodiments disclosed by flow diagram 900, complexity model 825 is built. Referring back to FIG. 8, when page weight determination engine 804 receives page objects 824 of page 605, it may retrieve object weights from complexity model 825.

Alternatively, page objects 824 may be provided to complexity model 825, which then provides page object 824 along with object weights 826 to page weight determination engine 804. First page object 818 may be compared to a similar page object in complexity model 825 to obtain a weight for the first page object. Second page object 820 may compared to a similar page object in complexity model 825 to obtain a weight for the second page object. Third page object 822 may be compared to a similar page object in complexity model 825 to obtain a weight for the third page object.

In some embodiments, the object weights for first page object 818, second page object 820, and third page object 822 may be added together to determine page weight 806. The disclosed embodiments, however, also apply complexity rules 828 to further modify weights based on additional factors. Complexity rules 828 may be provided to page weight determination engine 804. Alternatively, complexity rules 828 may be provided to complexity model 825 to apply to specific object weights for page objects that are then provided to page weight determination engine 804.

Figure 10:
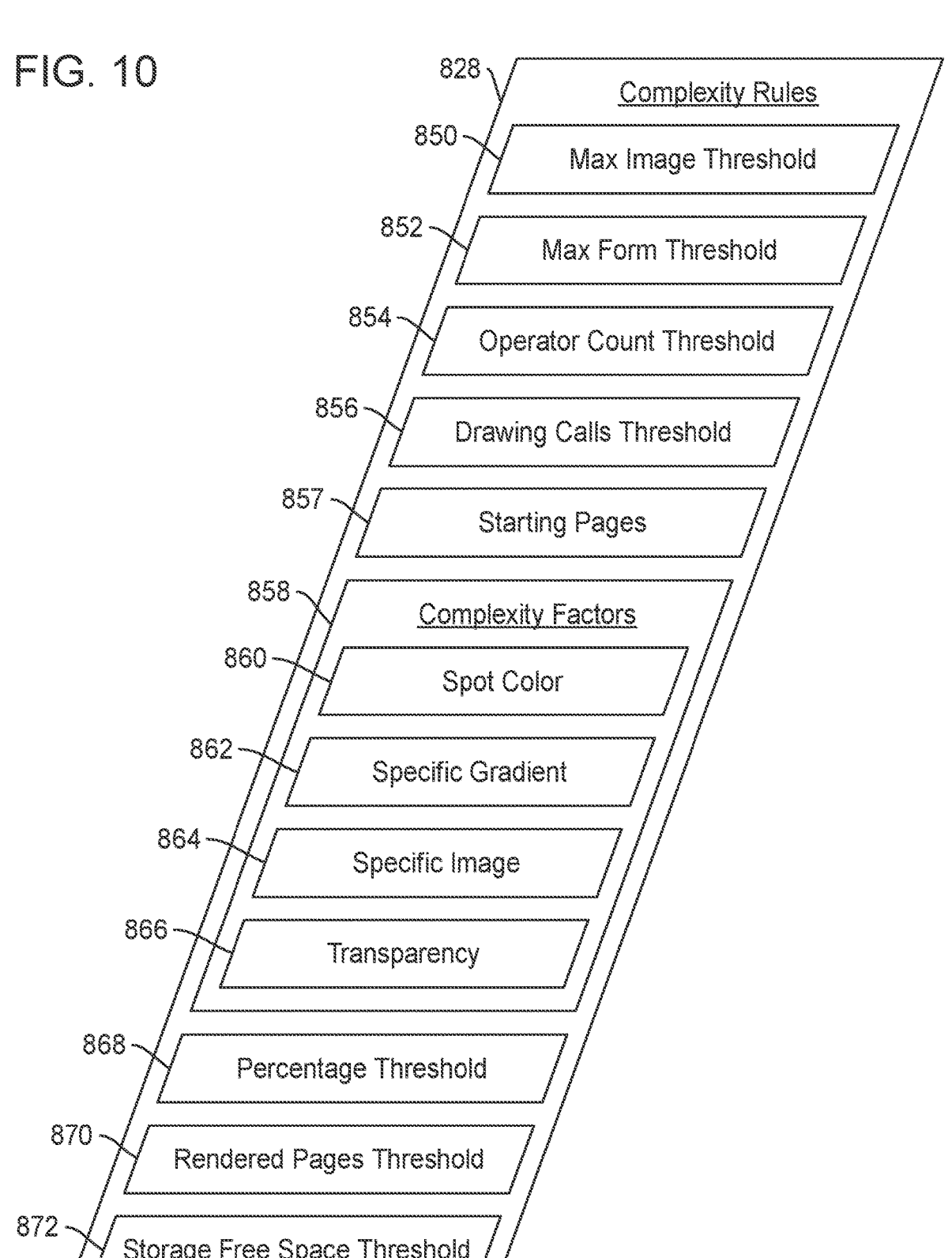
FIG. 10 illustrates a block diagram of the complexity rules for use in page complexity determination according to the disclosed embodiments.

FIG. 10 depicts a block diagram of complexity rules 828 for use in page complexity determination for page 605 according to the disclosed embodiments. Complexity rules 828 may be set by an operator or administrator. Alternatively, complexity factors may be determined using the process disclosed in flow diagram 900 for specific object conditions. If certain features of an object cause marked increase in processing time, then these may be made into a complexity rule.

For example, a page may be marked complex if the complexity formula weight, or page weight 806, exceeds base page weight 810. This rule may be applicable for all page complexity determination processes and disclosed above. In some complexity rules 828, this may be the only rule. Another rule may be that a page is marked complex if the size of a single image exceeds a maximum image threshold 850. Maximum image threshold 850 may include a value that causes the page to automatically be marked complex if an image on the page is above the threshold.

Another rule may be that a page is marked complex if the size of a single form exceeds a maximum form threshold 852. Maximum form threshold 852 also may include a value that causes the page to automatically be marked complex if a form within the page is above the threshold. Another rule may be that a page is marked complex if it exceeds an operator count threshold 854. Operator count threshold 854 may include an amount, such as a number of operators counted in one or more page objects, that causes the page to automatically be marked complex if the operators exceed the count.

Another rule may be that a page is marked complex if the number of drawing calls exceeds drawing calls threshold 856. Drawing calls threshold 856 may include a value, such as a number of drawing calls, within one or more page objects of the page. Examples of drawing calls include fill, stroke, text, image, and the like. If the number of drawing calls exceeds drawing calls threshold 856, then the page is automatically marked complex.

Starting pages rule 857 may refer to the situation where the initial starting pages equaling the number of RIPs within RIP system 110 always will be rendered. For example, if RIP system 110 includes 16 RIPs, such as RIP 400, then the first 16 pages of job 103 always are rendered and no complexity is determined for these initial pages. This feature allows some part of job 103 to be rendered, especially the first few pages that may be problematic. Such pages may include images or other objects that should be rendered.

Complexity rules 828 also may include complexity factors 858. A complexity factor may increase the assigned weight for a page object from complexity model 825 by a certain amount. For example, a complexity factor of 0.3 may increase a weight by 30%. Thus, a page object having a weight of 4.0 may be increased to 5.2 by application of the complexity factor. In other embodiments, the total page weight for the page may be multiplied by the complexity factor, which may be significant. If one of the conditions set forth in complexity rules 828 is met, then the appropriate complexity factor may be applied.

The data weight for a page object or a page increases by a spot color complexity factor 860 if a spot color is detected for an operation. For example, spot color 823 is determined to be used in third page object 822. This condition will cause the weight assigned to third page object 822 to be increased by spot color complexity factor 860. The data weight for a page object or page increases by a specific gradient complexity factor 862 if a specific gradient type is used. The weight for the page object or page will be increased by specific gradient complexity factor 862.

Further, the data weight increases by a specific image complexity factor 864 if a specific image type is detected in a page object. For example, the disclosed embodiments may already determine a specific image causes increased rendering time by print engine 260, but may not cause the page to automatically be complex. Other factors may allow the specific image to be rendered as a simple page. The data weight for the page object or the page increases by specific image complexity factor 864 if the specific image is used.

The data weight also may increase by a transparency complexity factor 866 is transparency is detected for an operation. The data weight for the page object having the operation increases by transparency complexity factor if transparency is detected.

Referring back to complexity rules 828, one rule may be that, for job 103 containing mostly complex pages, only a certain percentage of pages are rendered. Front end 302 will stop sending pages to RIP system 110 after a percentage threshold 868 is reached. In other words, after a certain percentage of pages in job 103 are rendered, or percentage threshold 868 is met, front end 302 will not render any further pages of job 103, even if some of the remaining pages are complex. For example, if percentage threshold 868 is .4, then front end 302 will stop sending pages to RIP system 110 if 40% of the pages of job 103 have been deemed complex and rendered. This feature may prevent storage 306 from being filled up with rendered pages of job 103 and not allow enough memory for current jobs being rendered.

Another threshold may be rendered pages threshold 870. Only a certain number of pages in job 103 are rendered to avoid excess resource usage, such as storage 306, and time competitiveness. Front end 302 will stop sending pages to RIP system 110 after rendered pages threshold 870 is met. Much like, percentage threshold 868, this feature seeks to prevent allocation of resources to a process and hold job.

Another threshold may be storage free space threshold 872. Front end 302 will stop sending pages to RIP system 100 if the disk free space falls below a value for free space threshold 872. Disk free space may refer to the amount of space available on storage 306. If storage 306 is 100 MB, then it may need 50 MB to perform rendering for current jobs and not delay processing to print engine 260. Storage free space threshold 872 may be 60 MB so if the available space at storage 306 falls below 60 MB, then front end 302 will stop sending complex pages of job 103 to RIP system 110.

Referring back to FIG. 8, complexity rules 828 may be applied by page weight determination engine 804. They also may be applied by page complexity determination engine 802. Application of complexity rules by page weight determination engine 804 may allow for a page to be determined complex without the need to determine page weight 806. For example, if page 605 includes a single image exceeding maximum image threshold 850, then the page is marked complex without the need to compare page weight 806 to base page weight 810.

Page complexity determination engine 802 applies the rule that a page is marked complex if page weight 806 exceeds base page weight 810. In some embodiments where scaled base page weight 816, the same determination is performed but using a scaled base page weight based on a scaled engine speed 814. For the disclosure below, base page weight may refer to base page weight 810 or scaled base page weight 816. If page weight 806 exceeds base page weight 810, then page 605 is marked complex and rendered by RIP system 110, unless cancelled by one of complexity rules 828.

In some embodiments, page complexity determination engine 802 may include page weight determination engine 804 within interpreter 402. Interpreter 402 may use a processor associated with RIP system 110 to enable the processes disclosed herein to determine page complexity.

Figure 11:
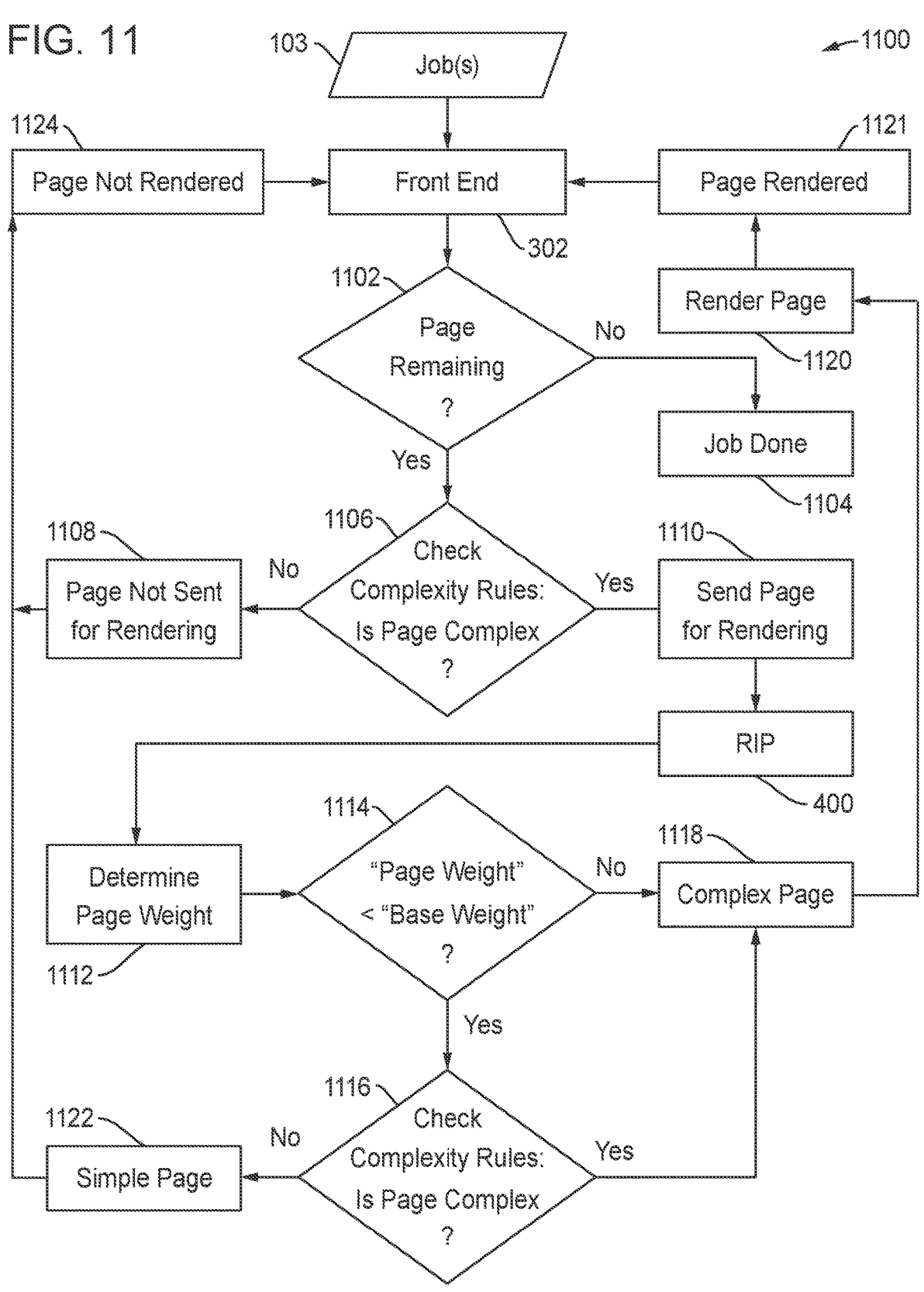
FIG. 11 illustrates a flow diagram for applying complexity rules and the page weight to determine complexity according to the disclosed embodiments.

FIG. 11 depicts a flow diagram 1100 for applying complexity rules 828 and page weight 806 to determine complexity according to the disclosed embodiments. Flow diagram 1100 may refer to FIGS. 1-10 for illustrative purposes. Flow diagram 1100 is not limited by the embodiments disclosed by FIGS. 1-10. The final process of the disclosed embodiments is to determine the complexity of page 605 by applying complexity rules 828 and the weighted formula on the objects of page 605 to determine page weight 806. Page weight 806 is compared to base page weight 810.

Job 103 is received by RIP system 110. Front end 302 receives job 103. If job 103 is marked for page complexity determination then front end 302 submits pages of job 103 for the page complexity determination process of flow diagram 1100. Step 1102 executes by determining whether a page is remaining to be analyzed from job 103. If no, then step 1104 executes by indicating job 103 is done processing. Front end 302 may store the locations of rendered pages, if any, from job 103 and note the remaining pages are not be rendered by job 103 is printed.

If step 1102 is yes, then step 1106 executes by determining whether any of complexity rules 828 apply to the remaining page or pages of job 103. For example, storage free space threshold 872 may be met such that no further rendering of pages for job 103 is to be done. If complexity rules 828 indicate that no further rendering of pages are to be done, then step 1108 executes by determining page 605 is not sent for rendering within RIP system 110. Flow diagram 110 proceeds to step 1124, disclosed below.

If complexity rules 828 indicate that rendering of pages may be done, then step 1110 executes by sending page 605 to a RIP 400 of RIP system 110 for rendering. Interpreter 402, however, will determine whether page 605 is complex or simple. Thus, step 1112 executes by determining page weight 806, as disclosed above. In some embodiments, page weight determination engine 804 may generate page weight 806 using page objects 824 from page 604 and complexity model 825 to obtain object weights. Page weight determination engine 804 then uses the weighted formula to determine page weight 806. These features are disclosed above.

Step 1114 executes by determining whether page weight 806 is less than base page weight 810. The determination of base page weight 810 is disclosed above. If step 1114 is yes, then page 605 may be rendered at engine speed 808 and is not complex. Step 1116, however, executes to determine whether any of complexity rules 828 apply to page 605. For example, one of the page objects may meet operator count threshold 854 or drawing calls threshold 856. If complexity rules 828 indicate that page 605 is complex despite its page weight 806 being less than base page weight 810, then flow diagram proceeds to step 1118.

If step 1114 is no, or step 1116 is yes, then step 1118 executes by determining page 605 is a complex page. Using the flow diagrams disclosed above, a complex page is rendered by RIP system 110. Thus, step 1120 executes by rendering page 605. Step 1121 executes by indicating to front end 302 that page 605 is rendered. Front end 302 notes this status for retrieving rendered pages from storage 306 when job 103 is printed.

If step 1116 is no, then step 1122 executes by determining page 605 is a simple page. Using the flow diagrams disclosed above, a simple page is not rendered by RIP system 110. It will be rendered when job 103 is printed. Step 1124 executes by indicating to front end 302 that page 605 is not rendered. Front end 302 may note this status in order to render the simple page when job 103 is printed.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" or "comprising," when used in this specification, specify the presence of stated features, integers, steps, operations, elements, or components, but do not preclude the presence or addition of one or more other features, integers, steps, operations, elements, components, and/or groups thereof.

Embodiments may be implemented as a computer process, a computing system or as an article of manufacture such as a computer program product of computer readable media. The computer program product may be a computer storage medium readable by a computer system and encoding computer program instructions for executing a computer process. When accessed, the instructions cause a processor to enable other components to perform the functions disclosed above.

The corresponding structures, material, acts, and equivalents of all means or steps plus function elements in the claims below are intended to include any structure, material or act for performing the function in combination with other claimed elements are specifically claimed. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiment was chosen and described in order to best explain the principles of the invention and the practical application, and to enable others of ordinary skill in the art to understand the invention for embodiments with various modifications as are suited to the particular use contemplated.

One or more portions of the disclosed networks or systems may be distributed across one or more printing systems coupled to a network capable of exchanging information and data. Various functions and components of the printing system may be distributed across multiple client computer platforms, or configured to perform tasks as part of a distributed system. These components may be executable, intermediate or interpreted code that communicates over the network using a protocol. The components may have specified addresses or other designators to identify the components within the network.

It will be apparent to those skilled in the art that various modifications to the disclosed may be made without departing from the spirit or scope of the invention. Thus, it is intended that the present invention covers the modifications and variations disclosed above provided that these changes come within the scope of the claims and their equivalents.

The invention claimed is:

1. A method for managing printing operations, the method comprising:

receiving a print job having a plurality of pages at a printing device, wherein the printing device includes a digital front end (DFE) for processing the print job and a print engine to perform printing operations;

retrieving page object weights for a plurality of page objects;

assigning a page object weight for each page object within a first page of the plurality of pages;

determining a first page weight for the first page according to the page object weight for each page object;

retrieving a base page weight from the DFE, wherein the base page weight corresponds to a print speed for the print engine;

determining whether the first page is a complex page or a simple page according to the first page weight and the base page weight;

if the first page is the complex page, rendering the first page within the DFE; and if the first page is the simple page, delaying rendering of the first page.

2. The method of claim 1, further comprising notifying a front end of a raster image processing system within the DFE that the first page is the complex page and rendered or that the first page is the simple page and not rendered.

3. The method of claim 1, further comprising determining the print speed for the print engine of the printing device.

4. The method of claim 3, further comprising modifying the base page weight according the print speed.

5. The method of claim 1, wherein the first page includes an image page object, vector page object, and a text page object.

6. The method of claim 5, wherein the page object weight for the image page object, vector page object, or text page object is greater than the base page weight.

7. A method for managing printing operations, the method comprising:

receiving a print job having a plurality of pages at a printing device, wherein the printing device includes a digital front end (DFE) for processing the print job and a print engine to perform printing operations;

determining to process a first page using a raster image processing (RIP) system of the DFE;

retrieving page object weights for a plurality of page objects;

assigning a page object weight for each page object within a first page of the plurality of pages;

determining a first page weight for the first page according to the page object weight for each page object;

retrieving a base page weight from the DFE, wherein the base page weight corresponds to a print speed for the print engine;

determining whether the first page is a complex page according to the first page weight and the base page weight;

if the first page is the complex page, rendering the first page within the DFE;

if the first page is not the complex page, applying a first complexity rule for the RIP system to the first page;

rendering the first page based on the first complexity rule and logging that the first page is not rendered with a front end of the RIP system.

8. The method of claim 7, further comprising marking the first page as complex if a size of a single page object of the first page exceeds a threshold value defined by the first complexity rule.

9. The method of claim 7, further comprising marking the first page as complex if a number of operations for first page exceeds a threshold value defined by the first complexity rule.

10. The method of claim 7, further comprising increasing the page object weight by a complexity factor if a specific operation defined by the first complexity rule is detected.

* * * * *